Sept. 21, 1954   J. D. DAVENPORT   2,689,581
HIGH-PRESSURE SAFETY RELIEF VALVE
Filed Oct. 3, 1952   2 Sheets-Sheet 1

INVENTOR.
James D. Davenport,
BY
Wilkinson, Huxley, Byron & Hume
Attys

Sept. 21, 1954 J. D. DAVENPORT 2,689,581
HIGH-PRESSURE SAFETY RELIEF VALVE
Filed Oct. 3, 1952 2 Sheets-Sheet 2
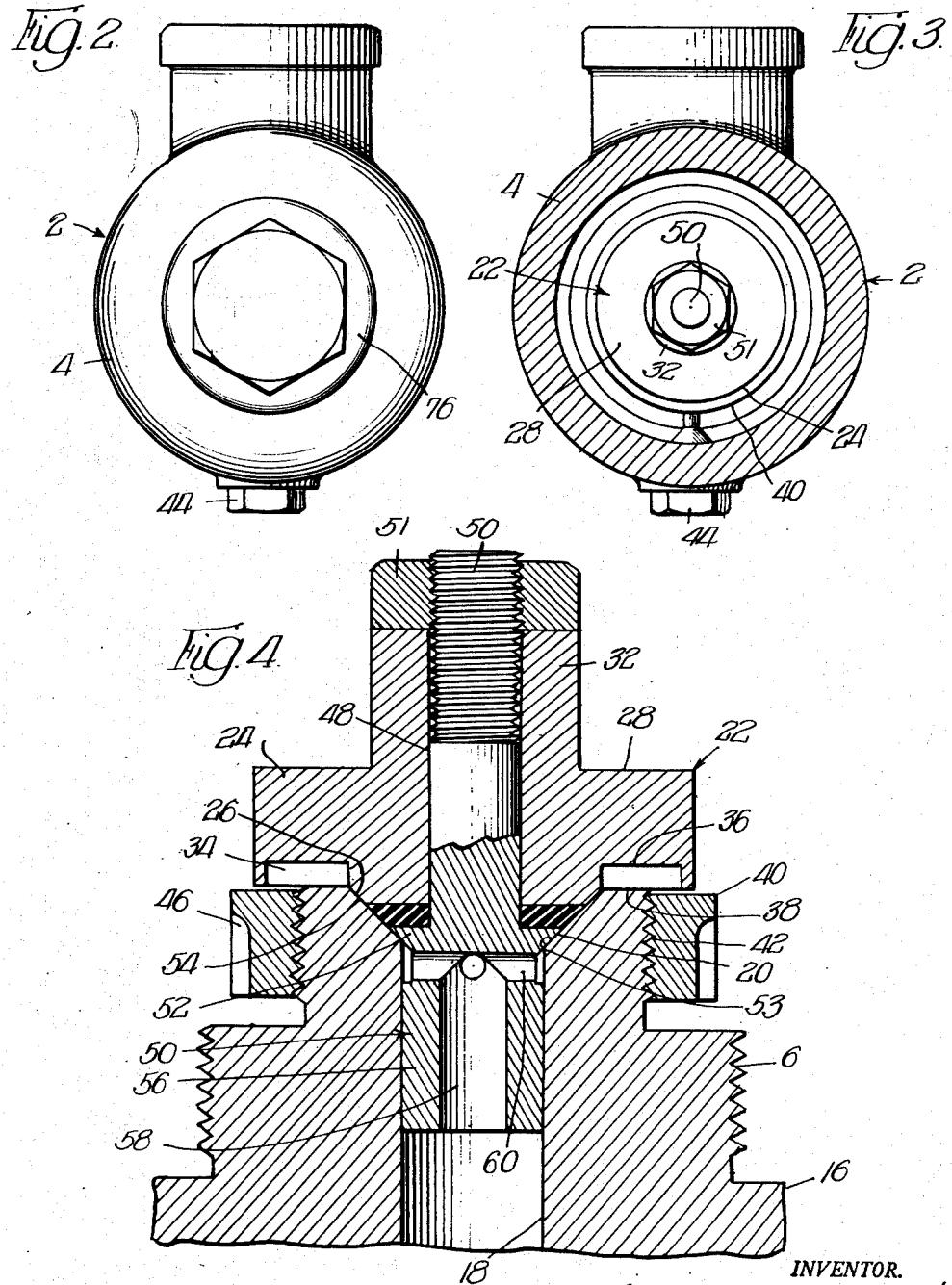
INVENTOR.
James D. Davenport,
BY
Wilkinson, Huxley, Byron & Hume
attys.

Patented Sept. 21, 1954

2,689,581

UNITED STATES PATENT OFFICE 2,689,581

HIGH-PRESSURE SAFETY RELIEF VALVE

James D. Davenport, Fort Wayne, Ind., assignor to Kunkle Valve Company, Fort Wayne, Ind., a corporation of Indiana Application October 3, 1952, Serial No. 312,892

5 Claims. (Cl. 137—478)

This invention pertains to valve mechanisms, and more particularly, to a high pressure safety relief valve for suddenly relieving pressure after it has reached a predetermined value.

Among the objects of the present invention is to provide a valve assembly wherein the valve remains bubbletight until the point of popping or opening of the valve is reached.

Another object of the invention is to provide a valve assembly wherein a simplified arrangement of bringing the force of the spring to the disc is employed.

Another object of the invention is to provide a valve assembly wherein the disc insert is protected at all times from damage due to the operation of the valve.

Another object of the invention is to provide a valve assembly wherein the novel disc assembly is so constructed as to be easily assembled or disassembled as the case may be.

Another object of the invention is to provide a valve assembly wherein after long usage the valve can be renewed by simply replacing the disc insert.

Another object of the invention is to provide a valve assembly wherein the valve has short blow-down or closes after a slight drop in pressure from the set pressure value.

Another object of the invention is to provide a valve assembly wherein there is provided a huddling chamber to control the valve blow-down, the huddling chamber being adjustable.

Other objects, features, capabilities and advantages are comprehended by the invention, as will later appear and as are inherently possessed thereby.

Referring to the drawings:

Figure 2 is a top plan view of the valve shown in Figure 1 of the drawings;

Figure 3 is a cross sectional view taken in the plane represented by the line 3—3 of Figure 1 of the drawings; and Figure 4 is an enlarged fragmentary view in cross section showing certain of the operating parts of the valve.

Figure 1:
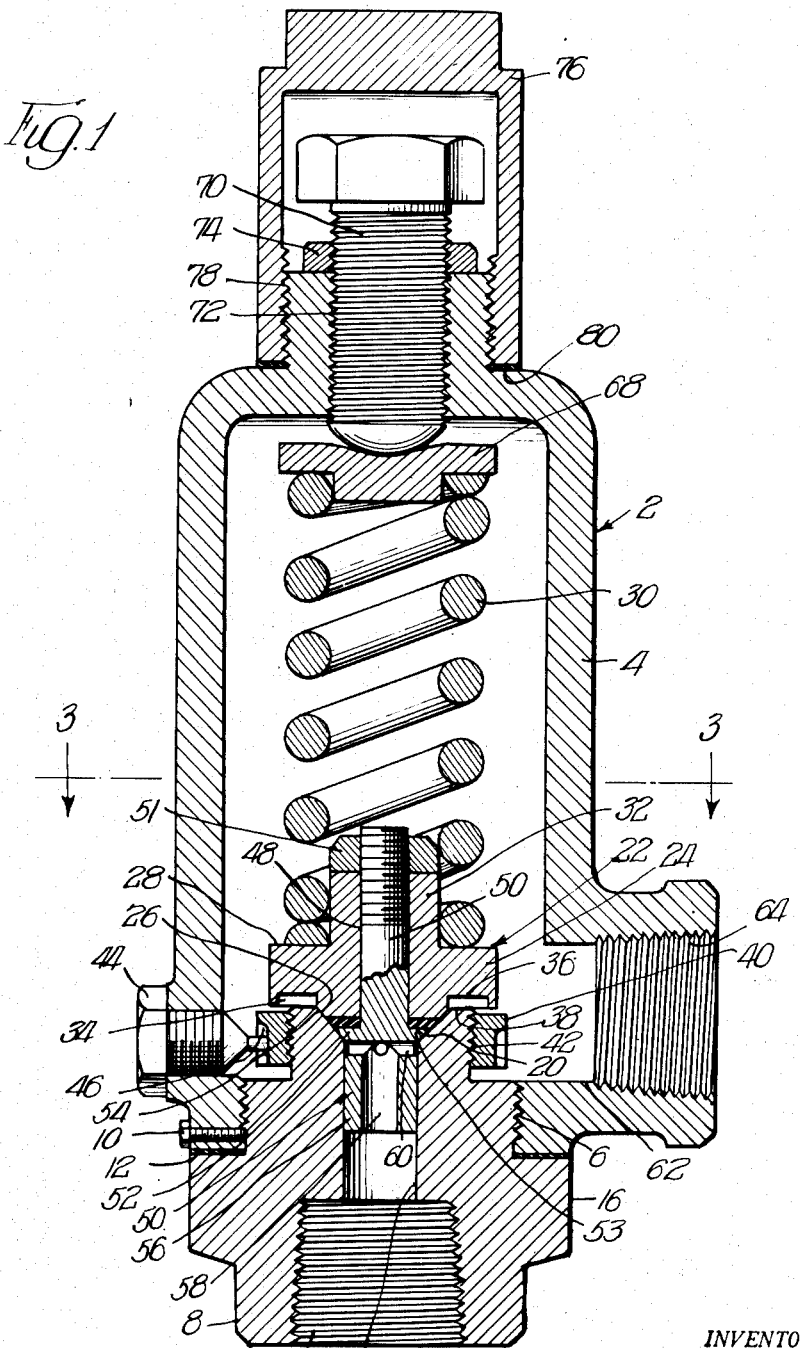
Figure 1 is a longitudinal cross-sectional view of a high pressure safety relief valve embodying the present invention.

Referring now more in detail to the drawings, an embodiment selected to illustrate the present invention is shown as comprising a housing, generally referred to by the reference numeral 2, which is formed in part by a cap 4 threaded as at 6, to threadedly receive a valve body 8, the said body 8 being fixed in relation to the cap 4 by means of a set screw 10 threadedly mounted in the cap and adapted to engage the body 8. A gasket 12 is interposed between the body 8 and the cap 4 to provide a fluid-tight joint at that point. The body 8 is provided with a threaded bore 14 for attaching the valve to a compressed air, water or other fluid pressure vessel, the said body having a hex portion 16 for receiving the jaws of a wrench or other tool for applying the valve to such a vessel.

The body is further provided with an axially extending bore or fluid passageway 18 terminating at the inner end of the body in a chamfered seat 20 adapted to have cooperative seating relation with a disc assembly, generally referred to by the reference numeral 22. This disc assembly comprises a disc 24 having the annular chamfered seat 26 adapted to have seating relation with the seat 20 of the valve body. This disc is further characterized as having an annular spring seat 28 adapted to receive one end of a coil spring 30, the said disc further including the spring guide portion 32 for the spring 30.

Adjacent the seat 26 of the disc is an annular huddle chamber 34 formed in part by an annular recess 36 surrounding the disc seat 26 and in part by the upper end 38 of the body 8 and a regulator ring 40 threaded, as at 42, to said upper end 38. This regulator ring 40 is held in any adjusted position by the regulator ring set screw 44 threadedly mounted in the cap 4 and having an inner end adapted to be received by any one of several grooves 46 provided in the regulator ring 40. The regulator ring 40 is adjustable to control the blow down of the valve by its movement in an upward or downward direction.

The disc 24 is provided with an axially extending bore 48 adapted to receive the threaded shank 50 of a shouldered valve member or disc guide, the said disc guide having the annular shoulder 52 between which and the disc 24 is disposed a disc insert 54 formed of deformable material, such as plastic or the like, which, when compressed as later pointed out, makes the valve absolutely bubble tight between the disc assembly 22 and seat 20 up to the set pressure determined by the loading of spring 30. The disc guide 50 is secured in assembled relation with the disc 24 for slight relative movement with respect thereto by the lock nut 51 threadedly engaging the threaded end of the shank 50 and the annular shoulder 52 is formed with a chamfered seat 53 which is adapted to seat with the seat 20 of the body 8.

The disc 24 is guided in its movement by the disc guide 50 which has a guide portion 56 slidably mounted in the bore or passageway 18 of the body 8. This guide portion 56 has the axial passageway 58 communicating with the passageway 18 and one or more radially extending passageways 60 whereby the controlled substance is discharged through the valve upon unseating of the disc assembly with respect to the seat 20. Such substance is discharged by way of the interior of the cap 2 and through the outlet passage 62 which is threaded, as at 64, for connection to a suitable conduit or pipe for transporting the controlled substance from the valve after discharge of the valve has occurred.

The upper end of the spring 30 is disposed in abutting relation to the spring plate 68 which is engaged by the pressure screw 70 threadedly mounted, as at 72, in the upper end of the cap 4 and which pressure screw is held in any of its adjusted positions by means of the lock nut 74. A hood 76 is threadedly mounted, as at 78, to the cap 4 to enclose the pressure screw 70, a fluid tight joint between the cap 4 and hood 76 being provided by the use of a gasket 80 interposed between the same.

By reference to the drawings it will be apparent that the pressure builds up below the disc guide 50 exerting a force which tends to raise the disc guide from the valve seat 20 of the body 8. The force used to counteract the pressure of the controlled substance is the spring force exerted on the disc 24. The two forces acting in opposite directions, one being applied to the disc 24 and the other being applied on the disc guide 50, squeeze the plastic disc insert 54 into the slight area between the seat 20 of the valve body 8 and the seat portion 26 of the disc 24, thus sealing the valve against leakage at this point. Thus it will be seen that the force tending to squeeze the plastic disc insert 54 by slight movement of the disc guide with respect to the disc is not decreased in any way by the rise in pressure of the controlled substance on the inlet side of the valve. The amount of force tending to squeeze the disc insert 54, thus sealing the valve, depends on the spring loading on the disc 24, it being noted that the disc 24 has metal-to-metal seating relation through its seat 26 with seat 20 of the valve body. The valve opens when the force of the spring is overcome by the force of the controlled substance, thus raising the disc assembly from the seat 20 of the valve body 8. A sudden opening of the valve is achieved by the use of the disc huddling chamber 34 which allows the high pressure substance to come into contact with a large area of the disc, thus snapping the valve open.

While I have herein described and upon the drawings shown illustrative embodiments of the invention, it is to be understood that the invention is not limited thereto, but may comprehend other constructions, arrangements of parts, details and features without departing from the spirit of the invention.

I claim:

1. A safety relief valve comprising an housing having an inlet passage for fluid under pressure and an outlet passage for said fluid, an annular valve seat between said inlet and outlet, a disc assembly including a spring pressed disc having seating relation with said seat, a shouldered valve member adapted to have seating relation with said seat and having an end portion in communication with said inlet passage, said valve member being mounted in said disc for axial movement with respect thereto, and a deformable sealing element interposed between the shoulder of said valve member and said disc adapted to be compressed radially into fluid-tight seating relation with said seat and upon relative movement of said valve member with respect to said disc upon build-up of fluid pressure in said inlet passage.

2. A safety relief valve comprising an housing having an inlet passage for fluid under pressure and an outlet passage for said fluid, an annular valve seat between said inlet and outlet, a disc assembly including a spring pressed disc having seating relation with said seat, a shouldered valve member adapted to have seating relation with said seat and having an end portion extending into said inlet passage whereby said member is guided in its movement, said member having a passageway therethrough for discharge of the controlled fluid from said inlet passage to said outlet passage, said valve member being mounted in said disc for axial movement with respect thereto, and a deformable sealing element interposed between the shoulder of said valve member and said disc adapted to be compressed radially into fluid-tight seating relation with said seat upon relative movement of said valve member with respect to said disc upon build-up of fluid pressure in said inlet passage.

3. A safety relief valve comprising an housing having a body portion and a cap portion, said body portion having an inlet passage terminating in an annular chamfered seat at the inner end thereof, said cap portion having an outlet passage, a disc assembly including a spring pressed disc having a chamfered face in seating relation with said seat, a disc guide mounted in said disc for relative movement with respect thereto having a portion provided with a chamfered face in seating relation with the seat and having means cooperating with said body portion for guiding said assembly, said disc guide having fluid passage means for discharge of fluid upon unseating of said disc assembly, and a sealing element between said disc and disc guide of deformable material having a chamfered face in the plane of the chamfered faces of the disc assembly and disc guide adapted to form a fluid-tight joint between said seat and assembly when deformed upon movement of said disc guide under the influence of fluid pressure.

4. A safety relief valve comprising an housing having a body portion and a cap portion, said body portion having an inlet passage terminating in an annular chamfered seat at the inner end thereof, said cap portion having an outlet passage, a disc assembly including a spring pressed disc having seating relation with said seat, a disc guide mounted in said disc for relative movement with respect thereto and having means cooperating with said body portion for guiding said assembly, said disc guide having fluid passage means for discharge of fluid upon unseating of said disc assembly, a sealing element between said disc and disc guide of deformable material adapted to form a fluid-tight joint between said seat and assembly when deformed upon movement of said disc guide under the influence of fluid pressure, and a huddle chamber associated with said seat formed in part by an annular recess in said disc and in part by the inner end of said body portion and an adjustable ring member whereby the blow-down of the valve is controlled by its various adjustments.

5. A safety relief valve comprising an housing having a body portion and a cap portion, said body portion having an inlet passage terminating in an annular chamfered seat at the inner end thereof, said cap portion having an outlet passage, a disc assembly including a disc having seating relation with said seat, a disc guide mounted in said disc for relative movement with respect thereto, said disc guide having a shoulder adapted to have seating relation with said seat and having a portion movable in and guided by said inlet passage, said portion having fluid passage means for discharge of fluid upon unseating of said disc assembly, a sealing element between said disc and disc guide of deformable material adapted to form a fluid-tight joint between said seat and assembly when deformed upon movement of said disc guide under the influence of fluid pressure, and a coil spring assembly interposed between said disc and said cap having means for varying the spring pressure applied to said disc assembly.

References Cited in the file of this patent

UNITED STATES PATENTS

| Number | Name | Date |
|---|---|---|
| 944,286 | Sherburne | Dec. 28, 1909 |
| 2,011,740 | Vallendor | Aug. 20, 1935 |
| 2,110,481 | Crocker | Mar. 8, 1938 |
| 2,485,092 | Gannon | Oct. 18, 1949 |
| 2,517,858 | Farris | Aug. 8, 1950 |
| 2,597,057 | Berquist | May 20, 1952 |
| 2,614,582 | St. Clair | Oct. 21, 1952 |
| 2,628,633 | Folmsbee | Feb. 17, 1953 |